United States Patent [19]
Dent

[11] Patent Number: 5,136,616
[45] Date of Patent: Aug. 4, 1992

[54] METHOD OF RAPIDLY CONTROLLING THE FREQUENCY OF A COHERENT RADIO RECEIVER AND APPARATUS FOR CARRYING OUT THE METHOD

[75] Inventor: Paul W. Dent, Stehag, Sweden

[73] Assignee: Telefonaktiebolaget L. M. Ericsson, Stockholm, Sweden

[21] Appl. No.: 468,941

[22] Filed: Jan. 23, 1990

[30] Foreign Application Priority Data

Jan. 26, 1989 [SE] Sweden ................................ 8900281

[51] Int. Cl.$^5$ .......................... H04B 1/26; H04L 7/04
[52] U.S. Cl. ................................... 375/94; 375/96; 375/97; 375/111; 371/46
[58] Field of Search ................. 375/77, 94, 96, 97, 375/106, 111; 371/43, 46; 370/95.3, 105.3

[56] References Cited

U.S. PATENT DOCUMENTS

| | | | |
|---|---|---|---|
| 4,027,250 | 5/1977 | Lang | 375/13 |
| 4,138,644 | 2/1979 | Godard et al. | 375/86 |
| 4,151,491 | 4/1979 | McRae | 333/18 |
| 4,227,152 | 10/1980 | Godard et al. | 375/13 |
| 4,234,957 | 11/1980 | Tracey et al. | 375/86 |
| 4,370,749 | 1/1983 | Levy et al. | 375/99 |
| 4,466,108 | 8/1984 | Rhodes | 375/83 |
| 4,885,757 | 12/1989 | Provence | 375/96 |
| 4,977,580 | 12/1990 | McNicol | 375/97 |
| 5,029,186 | 7/1991 | Maseng et al. | 375/94 |

FOREIGN PATENT DOCUMENTS 0239153 9/1987 European Pat. Off. .

OTHER PUBLICATIONS

Radio Test Performance of a Narrow Band TDMA System, Jan-Erik Stjernvall, Bo Hedberg and Sven Ekemark, Ericsson Radio Syst. AB pp. 1-6, IEEE Vehicular Tech. Tampa, Fl., Jun. 1987.
Adaptive Digital Phase Modulation, Torleiv Maseng og Odd Trandem, Telektronikk Nr 1, 1987, pp. 11-26.
Coded 8-DPSK Modulation with Differentially Coherent Detection-And Efficient Modulation Scheme for Fading Channels, Franz Edbauer, Inst. of Comm. Tech., DFVLR, pp. 42.2.1-42.2.4. Nov. 1987.
Theory and Practice of Error Control Codes, Richard E. Blahut, Addison-Wesley Pub. Co., Chapter 12, 1983.
Modulation, Coding and Performance, Ulrich Langewellpott/ AEG Olympia, Michael Reiner, AEG Olympia, 3b/1-3b-9, DCRC Oct. 1988.

Primary Examiner—Benedict V. Safourek
Attorney, Agent, or Firm—Burns, Doane, Swecker & Mathis

[57] ABSTRACT

The invention relates to a method and to an arrangement for rapidly controlling the frequency of a radio-receiver which receives signal-sequences which have been subjected to interference and which include a synchronizing-sequence and a data sequence. The signal-sequence is converted in an A/D-converter to provide signal-points ($E_T$) which are intended for analysis, and a Viterbi-algorithm (10) is adapted (12,13) with the aid of adaption signals ($U_1^K$) obtained from the synchronizing-sequence of the prevailing interferences. The data-sequence is Viterbi-analyzed through a large number of calculating stages, for the purpose of determining the bit-sequence (S1) of the data-sequence. According to the invention the signal-point ($E_T$) is branched-up to branch-signal points ($E_T$), the number of which is equal to the number of states of the Viterbi-algorithm (10). Each individual branch-signal point is phase-shifted (20) to a corrected signal-point ($E_{T,1}$) and is compared (21) with its adaptation signal ($U_1^K$), which has separate (K) signal points. Distances ($\Delta S_{T,1}^K$) and angular deviations ($\Delta \phi_{T,1}^K$) are calculated between the corrected signal-point ($E_{T,1}$) and the adaptation-signal ($U_1^K$) signal points. A transition ($K^1$) is selected through the Viterbi-algorithm (10), with the aid of the distances ($\Delta S_{T,1}^K$) and the angular deviation ($\Delta \phi_{T,1}^K$) corresponding thereto is selected (22). Selected angular deviations ($\Delta \phi_{T,1}^K$) for successive incoming signal-points ($E_T$) are low-pass filtered and integrated (22) to form a phase correction signal (V) through which the phase of the successively incoming branch-signal points ($E_T$) are shifted (20). Corresponding phase correction signals are calculated for the remaining states of the Viterbi-algorithm (10).

5 Claims, 3 Drawing Sheets

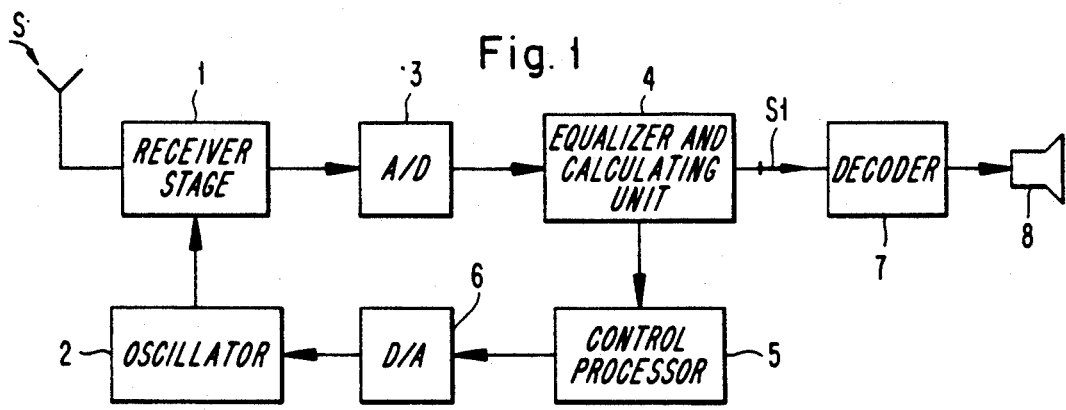
Fig. 1
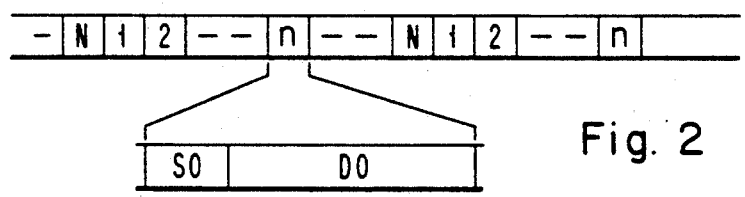
Fig. 2

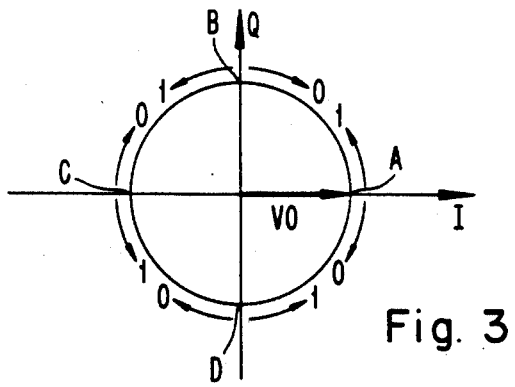
Fig. 3
Fig. 4
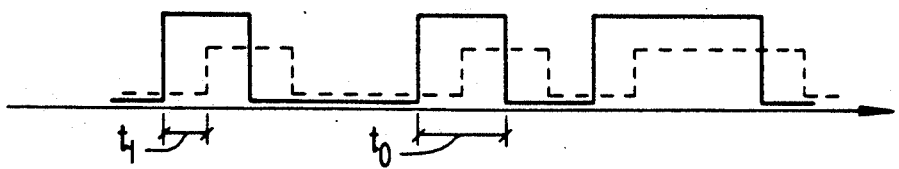

METHOD OF RAPIDLY CONTROLLING THE FREQUENCY OF A COHERENT RADIO RECEIVER AND APPARATUS FOR CARRYING OUT THE METHOD

TECHNICAL FIELD

The present invention comprises a method for rapidly controlling the frequency of a coherent radio-receiver which, via a channel which is subjected to interference, receives signal-sequences which include at least one synchronizing-sequence and at least one data-sequence, said method comprising the following signal-processing steps of:

converting a received signal-sequence to a baseband signal,

A/D-converting the baseband signal to points in an intended analysis plane;

adapting a Viterbi-algorithm having a desired number of states to the prevailing interference of the channel with the aid of adaptation signals obtained from the synchronizing sequence, the number of said adaptation signals being equal to the number of states in the Viterbi-algorithm; and Viterbi analysing the sequence of points in the signal analysis plane such as to finally determine the data bit sequence, as well as an apparatus for carrying out the method.

BACKGROUND ART

In many radio transmission systems, for instance time-divided so-called TDMA-systems, it is important that transmitter and receiver are well synchronized. It is also highly important that the local frequency generator of the receiver is locked very accurately to the transmitter frequency, particularly in the case of coherent transmission systems. An arrangement of apparatus for such a radio-transmission system is described in the article "Radio Test Performance of a Narrowband System" by Sjernvall, Hedberg and Ekemark, published in IEEE Vehicular Tech. Tampa, Fl., U.S.A., Jun. 1987.

The frequency error in a receiver where the receiver frequency has been at least roughly set is estimated in a frequency-error calculating device, and a control processor generates a correction signal for each new transmitted signal- sequence in accordance with the size of the correction obtained during the preceding signal sequence and in accordance with the estimated frequency error. The correction signal is sent to a controllable local oscillator, according to the aforesaid article a so-called frequency synthesizer, which is constructed to generate mixing signals, the frequencies of which are corrected in dependence on the control-processor signal. This signal is digital and in practice is converted to analog form in a digital/analog converter before being sent to the local oscillator. Consequently, the number of stages in which the oscillator output frequency can be adjusted is dependent on the number of binary bits which the converter is able to convert. When a relatively small and simple converter is used, either the maximum frequency swing from the local oscillator will be small or the frequency stages will be relatively large.

The transmitted signal can be subjected to interference in systems of the aforesaid kind. This interference or disturbance may, for instance, be in the form of an added noise-signal or in the form of multiple-path propagation due to repeated reflection of the signal against buildings, mountains etc.. This is often the case in mobile radio transmissions, as is described in an article published in the Norwegian technical journal Telektronikk Nr 1, 1987, Torleiv Maseng and Odd Trandem: "Adaptive digital phase modulation". The article describes a coherent receiver which incorporates an equalizer in the form of an adaptive viterbi-analyser. The transmitted signal comprises periodically recurring signal sequences which include a synchronizing sequence and a data sequence as mentioned in the aforegoing. The signals are frequency-mixed and converted in an analog-digital converter, in the aforedescribed manner, and stored in a memory. The Viterbi-analyzer is adapted to the prevailing transmission characteristics of the channel with the aid of the synchronizing sequence, these characteristics being determined primarily by said multiple path propagation. The data sequence is analyzed in the Viterbi-analyzer for the purpose of extracting the content of the original transmitted signal.

An article in IEEE/IEICE Global Communications Conference, Tokyo, Nov. 15-18, 1987 by Franz Edbauer: "Coded 8-DPSK Modulation with Differentially Coherent Detection An Efficient Modulation Scheme for Fading Channels" describes a radio receiver equipped with a Viterbi-analyzer. This analyzer assists in controlling the frequency of a received signal. According to this article, the Viterbi-analyzer is set permanently and cannot be adapted to handle variations in channel conditions for instance.

A more detailed description of the Viterbi-algorithm applied in the Viterbi-analyzer is given in Richard E. Blahut: "Theory and practice of error control codes", chapter 12, Addison-Wesley 1983.

DISCLOSURE OF THE INVENTION

It is mentioned in the aforesaid article published in the journal Telektronikk that during signal transmission a small drift in frequency can occur, which is manifested in the form of a successive phase-shift of the receiver bits. When this phase-shift is small, no compensation is necessary. When the phase-shift reaches a given value, however, there is a danger that an decision-error will be made in the Viterbi-analyzer when analyzing the data-sequence. The present invention is based on the concept of utilizing the states which occur in the Viterbi-analysis to effect an adjustment of the phase of the signal intended for analysis in the Viterbi-analyzer. In this respect all of the Viterbi-analysis states are used and the values extracted for each state are compared with the signal to be analysed, in order to achieve the aforesaid phase-adjustment. The invention has the characterizing features set forth in the accompanying claims.

BRIEF DESCRIPTION OF THE DRAWINGS

An exemplifying embodiment of the invention will now be described with reference to the accompanying FIGS. 1 to 9 of which FIG. 1 is a block-schematic illustrating a known radio receiver;

FIG. 2 is a diagram illustrating signal-sequences in a time-divided transmission system;

FIG. 3 illustrates a complex numeric coordinate system with signal modulation;

FIG. 4 is a diagram illustrating time-displaced bit-sequences;

DESCRIPTION OF PREFERRED EMBODIMENTS

Figure 9:
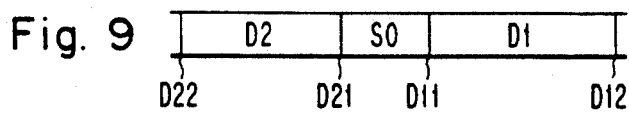
FIG. 9 is a diagram illustrating a further signal-sequence format.

FIG. 1 illustrates schematically a radio receiver which is intended for use with a system that incorporates time-divided transmission of information in digital form. A received signal S is mixed-down in a known manner in a receiver stage 1 which includes a low-frequency and an intermediate frequency stage. The receiver stage 1 receives a high-frequency and an intermediate-frequency signal from a local oscillator 2, for instance a frequency synthesizer. The mixed signal, the baseband signal, is converted in an analog-digital converter and stored in a memory in a buffer 3. A signal is sent from the buffer to a block 4, which includes an equalizer and means for calculating frequency error. This frequency-error calculating means may comprise a calculating unit in which the frequency error is calculated on the basis of the successively changed phase-positions of the received signal in relation to the expected or anticipated phase-positions of said signal. Data relating to the frequency error is supplied to a control processor 5, which calculates a control signal for correction of the local-oscillator frequency. This control signal is digital and is converted in a D/A-converter 6, prior to being sent to the local oscillator 2. The mixing signal generated in the oscillator is changed in small increments, owing to the fact that the D/A-converter 2 converts only limited number of bits. This results in a residual frequency-error, which can cause errors in the transmitted signal. Such frequency-errors can also occur in receivers in which frequency is controlled more accurately.

The block 4 produces an output signal S1 which corresponds to the received signal S. The signal S1 is sent to a block 7 which includes a channel-decoder and a speech-decoder, and means for converting the decoded signal S1 to an analog speech-signal. The speech signal is sent to a loudspeaker 8.

Radio receivers of the kind described briefly in the aforegoing may be included in a system that incorporates time-division signal transmission. The system has time-division channels which are N in number, as illustrated in FIG. 2. Each user is assigned a given time slot n during which a signal frequency is transmitted. Each signal sequence includes a synchronizing-sequence S0 and data-sequence D0 which contains the information to be passed-on. The signals in the signal sequences relevant in the case of the present invention are coherent, and an example of one such coherent signal is illustrated in FIG. 3. The signal is represented by a vector V0 in a complex numeric coordinate system with the real axis referenced I and the complex axis referenced Q. A transmitted "1" corresponds to a phase-rotation through one quarter of a revolution in a positive sense, whereas a transmitted "0" corresponds to a phase-rotation through one quarter of a revolution in a negative sense between the points A, B, C and D. The vector V0 can be stated in a conventional manner, by its real and imaginary parts, or in polar coordinates in terms of its length and its angle relative to the positive I-axis.

Each transmitted "1" and "0" takes up a given time-interval in the signal sequence, the so-called bit time. FIG. 4 illustrates schematically a signal diagram in which T signifies time and t0 is the bit time. As before mentioned, the transmitted signal can reach the receiver via a direct path between the transmitter and the receiver and via one or more routes or paths along which the signal is reflected against mountains buildings etc.. The reflected signals travel a longer path than the direct signal, which results in a time-shift t1 between direct and reflected signals. The time-shift t1 may extend to several bit-times and cause intersymbol interference of the received signal S. The shorter the bit-time, the more bits that are accommodated within the time shift and the more serious the intersymbol interference.

Figure 5:
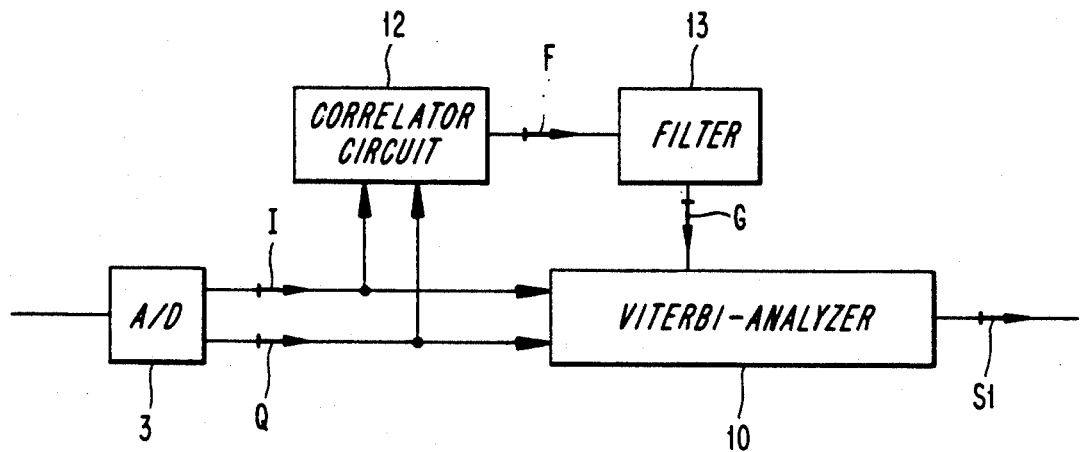
FIG. 5 is a block schematic of a known adaptive Viterbi-equalize.

As mentioned in the aforegoing, the receiver of the FIG. 1 embodiment includes an equalizer. The incoming mixed and digitalized signal is processed in the equalizer, in order to be able to extract the content of the originally transmitted signal. In the case of an inventive receiver constructed in accordance with FIG. 5, the equalizer comprises, in a known manner, an adaptive Viterbi-analyzer 10 which is used, in accordance with the invention, to control the frequency of the signal entering the Viterbi-analyzer. The use of a Viterbi-analyzer as an adaptive equalizer is described in the aforesaid article published in the journal Telektronikk and will be outlined summarily herebelow in connection with FIG. 5. The Viterbi-analyzer is connected to the buffer 3 shown in FIG. 1. The buffer is also connected to a correlator circuit 12 which, in turn, is connected to a filter circuit 13. The output of the filter circuit is connected to the Viterbi-analyzer. The Viterbi-analyzer is provided with a desired number of states $M=2^m$, where $m=2,3...$.

Figure 6:
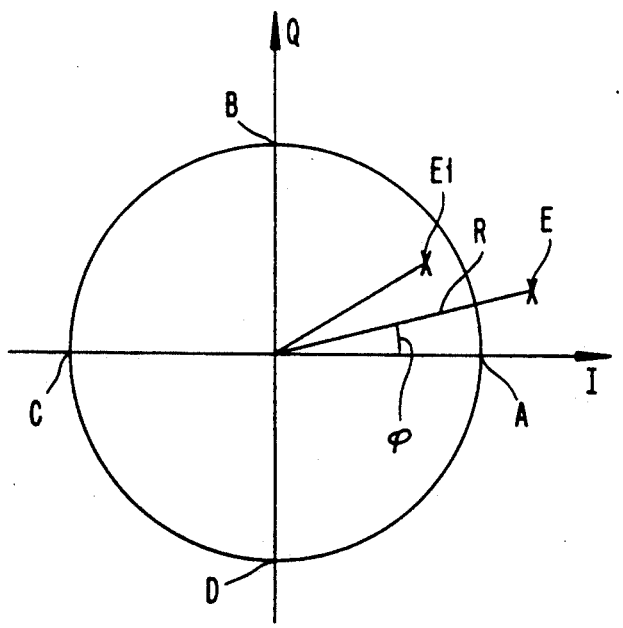
FIG. 6 illustrates a complex numerical coordinate system with signal points.

The Viterbi-analyzer is adapted in the following manner to the channel conditions which prevail during a signal sequence. As illustrated in FIG. 2, the received signal-sequence includes the synchronizing sequence S0, which is received by the correlator 12 from the buffer 3. The known synchronizing-sequence is stored in the correlator and the correlator compares the bit-pattern of the known synchronizing-sequence with the wave form of the received synchronizing-sequence. The correlator sends a signal F to the filter circuit 13, in which a filter is built-up in order to correspond to the transmission properties of the channel during the duration of the received signal-sequence, so-called channel estimation. The Viterbi-analyzer 10 receives the data-sequence D0 from the buffer 3, and with the assistance of a signal G from the filter circuit 13 is able to determine the content of the data-sequence D0 by carrying out a large number of traditional Viterbi-calculations. Assume, for instance, that one of the signal points in D0 received by the Viterbi-analyzer 10 lies in a point El, as illustrated in FIG. 6. The position of this point is contingent, inter alia, on the degree of accuracy to which transmitter and receiver are synchronized. Subsequent to full analysis in the Viterbi-analyzer 10, there is determined a final bit-sequence which is transmitted with the signal S1 for conversion to a speech-signal in accordance with FIG. 1.

As before mentioned, the received bits may undergo a successive phase shift, which in unfavourable circumstances may be so large as to make it highly improbable that the bits can be referred to any of the points A, B, C or D in FIG. 3. This problem is solved in accordance with the invention by utilizing the states and transitions in the Viterbi-analyzer 10 for controlling the frequency of the received signal-sequence. This frequency control is performed for each state and corresponds to a successive shift in the phase-position of the received signal points.

It should be noted that in the aforedescribed embodiment the signal-points have been given in a complex numeric coordinate system having the coordinates I,Q. This has been illustrated in FIG. 5 by double signal-paths, one for each coordinate. The signal-points, for instance the signal-point E in FIG. 6, can be given by a radius R and an angle $\phi$.

Figure 7:
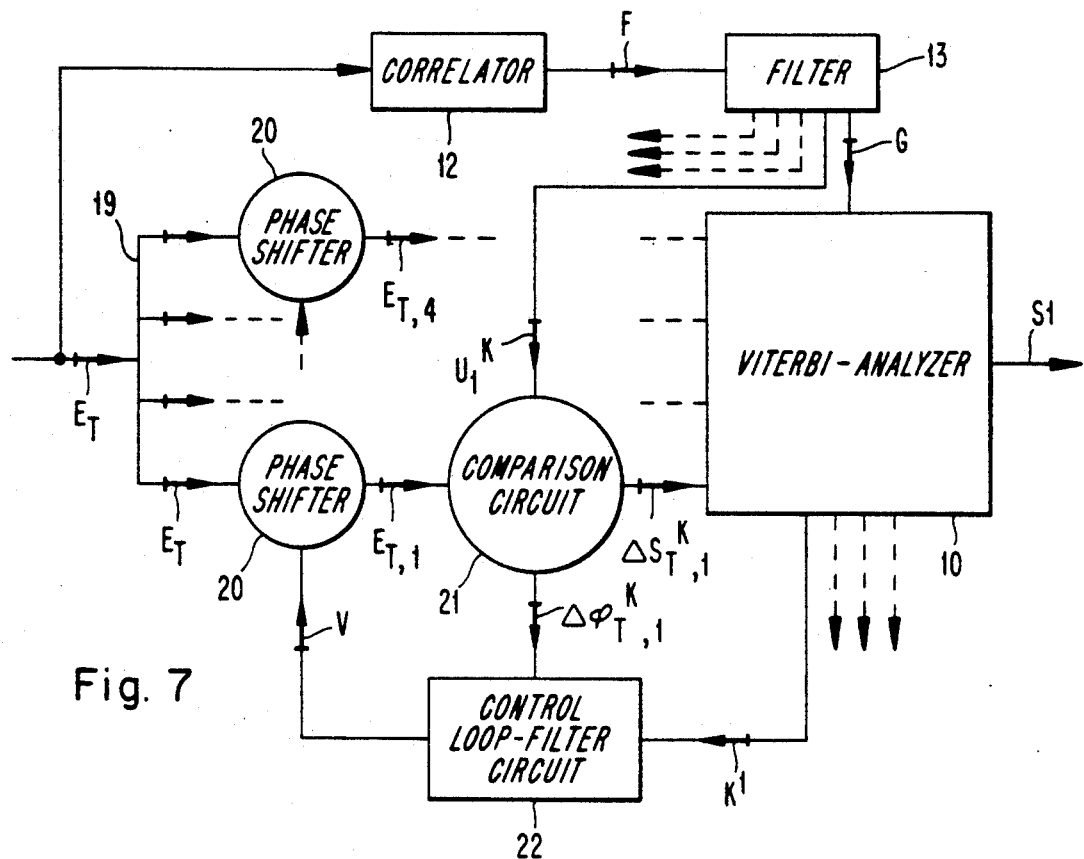
FIG. 7 is a block schematic of the Viterbi-equalizer incorporating the inventive frequency-control facility.
Figure 8:
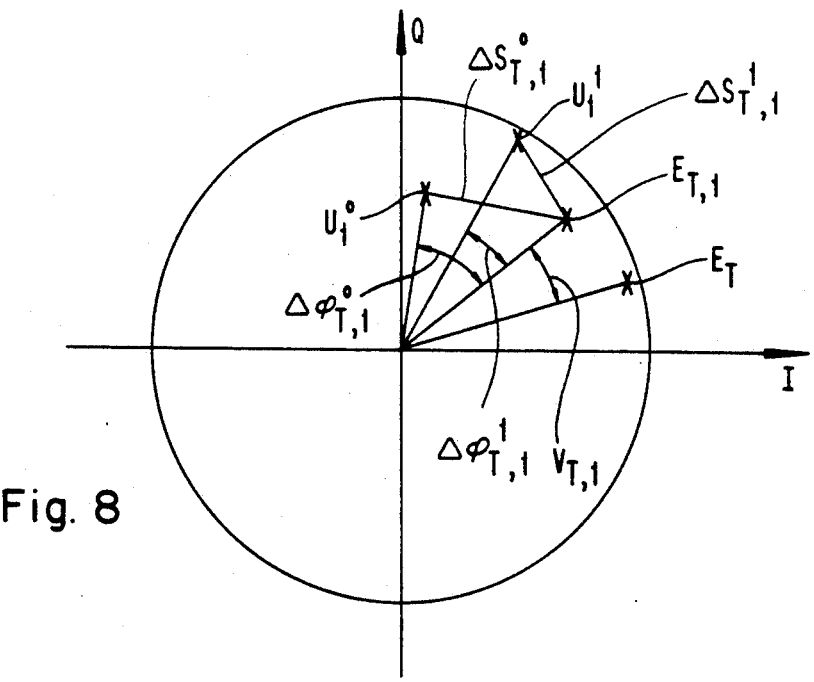
FIG. 8 illustrates a numerical coordinate system with distance and angle deviations between signal-points.

According to one embodiment of the invention, described below with reference to FIGS. 7 and 8, the aforedescribed adaptive Viterbi-analyzer can be used for rapid frequency-control purposes. FIG. 7 illustrates the Viterbi-analyzer 10 with the correlator circuit 12 and the filter circuit 13. The Viterbi-analyzer is adapted with the aid of the synchronizing-sequence in the manner described above with reference to FIG. 5. As before mentioned, the Viterbi-analyzer functions with individual states which are $M=2^m$, $m=2,3...$, in number, according to the example the $m=2$, and the incoming signal is branched-up with a branch 19 for each state. The incoming signal-point is referenced $E_T$, where the index T signifies that the signal-point refers to the time-point T. The signal-processing procedure will be described solely in respect of the first state and signal paths of the remaining states have been indicated in broken lines in FIG. 7. The signal-point $E_T$, which is also shown in FIG. 8, is applied to a phase-shifter 20. In the case of the first state, the phase-shifter 20 has shifted $E_T$ to a point $E_{T,1}$, where the index numeral refers to the state number. $E_{T,1}$ is shifted through an angle $V_{T,1}$, which is the correction predicted for the first state at time T. The signal-point $E_{T,1}$ is sent to a comparison circuit 21, which also receives a predicted signal point value $U_1^K$ from the filter-circuit 13. The index numeral 1 of the reference $U_1^K$ refers to the first state, the letter K refers to the relevant transition between the states and in the case of the illustrated embodiment can assume either one of the two values $K=0$ and $K=1$. The signal-points $U_1^0$ and $U_1^1$ are illustrated in FIG. 8 and have angular deviations in relation to $E_{T,1}$ designated $\Delta\phi_{T,1}^0$ and $\Delta\phi_{T,1}^1$ respectively. The distances between the signal-points $E_{T,1}$ and $U_1^0$ and $U_1^1$ are respectively designated $\Delta S_{T,1}^0$ and $\Delta S_{T,1}^1$. The comparison circuit 21 is operative to compare the positions of the signal-points $E_{T,1}$ and $U_1^0$ respective $U_1^1$ and calculates said angular deviations $\Delta\phi_{T,1}^K$ and the distances $\Delta S_{T,1}^K$. The comparison circuit 21 sends the signal $\Delta\phi_{T,1}^K$ to a control loop-filter circuit 22 and the signal $\Delta S_{T,1}^K$ to the first state in the Viterbi-analyzer 10. The Viterbi-analyzer chooses the best path in the path-memory of the analyzer, thereby determining which of the transitions $K=0$ or $K=1$ is the best transition in this instance. The value obtained thereby, designated $K^1$, is used to determine which of the internal variable values of the control loop-filter circuits 22 are selected to survive as the internal state of the control circuit associated with successor state no 1. In the example and according to the Viterbi state transition principle, the control circuit variables of either state 1 or $M/2+1$ would become the new control variables for state 1, according as $K^1=0$ or 1. A similar calculation in the Viterbi trellis decides whether the Viterbi state contents, including control loop-filter circuit 22 contents, of state 1 or $M/2+1$ survive to become the new contents of state 2. Likewise the Viterbi state transition principle in this binary example decides which of state i's or state $(M/2+i)$'s contents survive to become the new contents of states $2i-1$ and $2i$.

In a more general Viterbi algorithm perhaps envisaged for nonbinary signals or having more than two predecessor states competing to survive as a successor state, the control loop-filter circuit 22 values of that predecessor state which survives become the control circuit values of the successor state.

The control loop-filter circuit values may for example consist of an integral $I_{T,K}$ of past angular deviations $\Delta\phi T,1$ $^{KI}$ designed to filter out rapidly varying fluctuations due to noise, as well as the $\Delta\phi_{T,1}^{K1}$ of the surviving transition $K^1$, and an estimate $F_{T,1}$ of the frequency error (time derivative of phase) which may be updated using the surviving $\Delta\phi_{T,1}^{K1}$ value according to known servo-control theory. In this way a phase correction signal V, corresponding to the signal $V_{T,1}$, is obtained, which successively shifts the phase of incoming signal-points for the first state. When $I_{T,K}$, $\Delta\phi_{T,1}$ and $F_{T,1}$ are used to predict the next phase value at time $T+\Delta T$ for state 1, a so-called PID (proportional integral derivative) controller can for example be constructed. It can be named that the parameters of the control algorithm in the control loop-filter circuit 22 can be programmable and even chosen depending on the observed received signal characteristics.

As before mentioned, the incoming signal-point $E_T$ is branched-up so as to provide a branch for each state. Each branch is phase-shifted per se in a phase-shifter 20 with a phase correction signal which is calculated for each state per se in the manner described above with respect to the first state. The distance differences, often referred to as "metrics", are also calculated for each state per se, in accordance with the above. The distance differences are processed in the Viterbi-analyzer 10 in a known manner, and the analysis results in a sequence of bits which are converted, for instance, to a speech signal in the manner described above with reference to FIG. 1.

The invention according to the described exemplifying embodiment can be applied to a signal-transmission system whenever a Viterbi-analyzer can be used. Examples of modulation forms which can be utilized are QAM-modulation, Quadrature Amplitude Modulation or GMSK-modulation, Gaussian Minimum Shift Keying.

The GMSK-modulation form is described in more detail in Conference Proceedings Digital Cellular Radio conference, Oct. 12–14 1988, Hagen, Westphalia FRG, in an article by Ulrich Langewellpott: "Modulation, Coding and Performance".

There has been described in the aforegoing an arrangement for controlling the phase of the signal arriving at a Viterbi-analyzer. The invention also relates to a frequency-control method which can be applied with the aid of the aforedescribed arrangement. A preferred method includes the following known steps:

The received signal-sequence S is mixed-down with a known frequency to a baseband signal. This signal is converted in an analog-digital converter to form signal-points (I,Q), which are then stored. The received signal is subjected to interference during the signal-transmission procedure, for instance, due to multiple path-propagation, and the data speed is relatively high and consequently intersymbol-interference can occur. Consequently, the received signal is equalized, which in the case of the inventive method is effected with the aid of a known Viterbi-algorithm. This algorithm is adapted to prevailing channel-conditions in a known manner, with the aid of the synchronizing-sequence SO. The transmitted data-sequence DO is analyzed in the Viterbi-analyzer through a relatively large number of calculating stages, so as to extract the bit-sequence of the data-sequence. The inventive method comprises the following additional stages:

The incoming signal-point $E_T$ is branched-up in identical signal-points, the number of which is equal to the number of states in the selected Viterbi-algorithm. For the first state, the phase of the signal-points is shifted through the angle $V_{T,1}$, which is the phase-correction estimated for the first state at T. The phase-shift is changed in the following manner. The phase-shifted signal-point $E_{T,1}$ is compared with the signal-points $U_1^K$. These signal-points are obtained from the synchronizing sequence SO of the signal-sequence in a known manner when adapting the Viterbi-algorithm to the channel. When carrying-out the comparison, the angular deviations $\Delta\phi_{T,1}^K$, and the distances $\Delta S_{T,1}^K$ in the complex numeric coordinate system I,Q are calculated for each of the transitions in the Viterbi-algorithm. The best transition of the two transitions $K=0$ or $K=1$ is determined in each case through the Viterbi-analysis in a known manner, with the aid of the distances $\Delta S_{T,1}^K$. One of the calculated angular deviations $\Delta\phi_{T,1}^{K1}$ is selected together with the internal values of one of the control loop-filter circuits 22 according to the selected value of K. The selected value of $\Delta\phi_{T,1}^{K1}$ is used to update the selected control circuit values according to known control theory, and the updated values become the control circuit values of the new successor state. In this way the phase-correction signal V is obtained, which is the new value of $V_{T,1}$ for the first state. Correspondingly, the angle-shift signal is calculated for the remaining states, through which the remaining branched signal-points $E_T$ are phase-shifted prior to analysis in accordance with the Viterbi-algorithm. Phase corrections for following incoming signal points are successively calculated in a similar manner.

A format for the transmitted signal-sequence, including a synchronizing-sequence SO and a subsequent data-sequence DO, has been described with reference to FIG. 2. FIG. 9 illustrates an alternative signal-sequence format, in which the synchronizing-sequence SO is located in the centre of the signal-sequence and embraced on either side by data-sequences D1 and D2. An inventive receiver can be constructed such that the frequency of the receiver will be controlled in the following manner, when demodulating this latter signal-sequence.

As described in the aforegoing, the Viterbi-analyzer is adapted through the synchronizing-sequence SO. Demodulation of D1 commences at a point D11 and terminates at a point D12. Demodulation of D2 then continues, commencing at a point D21 and terminating at a point D22, or vice versa. Angles which correspond to $\Delta\phi_{T,1}^K$ for the data-sequence D1 are herewith calculated successively, and the angles are filtered and integrated in the aforedescribed manner. Corresponding calculations for the datasequence D2 are carried out subsequent hereto, wherein the final values in the control loop-filter circuit 22 of the best state surviving from D1 be used to derive starting values for the control circuits for demodulation of D2. It should be observed that when the transmitted signal-sequence has the format illustrated in FIG. 9, it is necessary to store the received signal in a memory, preferably subsequent to A/D-conversion. No such storage is necessary in the case of a signal format such as that illustrated in FIG. 2.

In the case of the aforedescribed embodiments, the transmitted signal-sequence SO, DO has been binary modulated in the manner described with reference to FIG. 3. The Viterbi-analyzer 10 utilized for demodulating the signal-sequence has two possible transitions between the states, corresponding to the two levels in the binary code. It is also possible to apply the invention in those cases when the transmitted signal-sequence has several modulation levels, which is often the case when the signal is modulated in accordance with the aforesaid QAM-modulation principle. The Viterbi-analyzer used in this case for demodulation and for accomplishing the inventive frequency-control has several possible transitions between the states. More specifically, the number of transitions is equal to the number of modulation levels for the modulation form selected. The number of signal-points $U_1^K$ in the adaptation signal from the filter circuit will also increase. In the example described with reference to FIG. 7 and 8, the signal-points are two in number, $K=0$ and $K=1$. In the case of the more general modulation-form, the number of signal-points is equal to the number of modulation levels, and the number of angular deviations $\Delta\phi_{T,1}^K$, and the distances $\Delta S_{T,1}^K$ is also equal to the number of modulation levels.

A method and an arrangement in which the signal-point $E_T$ was branched-up with a branch 19 for each state, had been described in the aforegoing with reference to FIG. 7. All branch-signal points are processed simultaneously in the mutually parallel branches, and each branch includes the phase-shifter 20, the comparison-circuit 21 and the control loop-filter circuit 22. However, it is possible in accordance with the invention to process the branch-signal points $E_T$ for the individual states sequentially at time-point T, instead of employing the aforesaid parallel signal-processing procedure. In this alternative case, the signal-point $E_T$ are stored in a memory and the branch-signal points are fed-out sequentially. The branch-signal point for each state is processed in the manner described with reference to FIG. 7 for the first state. The phase-correction signals V for the individual states are stored in memories and are utilized in the aforedescribed manner for successive shifting of the subsequently incoming signal points.

It can be mentioned that the invention can just as well be implemented by applying the phase-correction signal V for each state to the adaption signals $U_j^K$ as an alternative to application to incoming signal points $E_{T,i}$.

I claim:

1. A method for controlling the frequency of a radio receiver wherein a channel subjected to interference is used to receive signal sequences including at least one synchronizing sequence and at least one data sequence, comprising the signal processing steps of:
   converting a received signal sequence to a baseband signal;
   sampling the baseband signal to obtain a plurality of signal points in a signal plan;
   correlating said synchronization sequence with a known synchronization sequence to thereby generate a plurality of adaptation signals;

adapting a Viterbi algorithm having a desired number of states chosen according to prevailing interference conditions of the channel based on at least the adaptation signals, the number of adaptation signals corresponding to the number of states in the Viterbi algorithm;

analyzing the signal points in the data sequence in a Viterbi analyzer according to said Viterbi algorithm to determine a bit sequence of the data sequence;

fanning out a signal corresponding to one of the signal points at a particular time to obtain branch signal points, each of the branch signal points corresponding to a respective state of the Viterbi algorithm;

phase shifting the branch signal point of each respective state through an angle associated with that respective state to obtain a respective corrected signal point;

comparing the corrected signal point for each of the respective states with the adaptation signal corresponding with the respective state, said adaptation signal having signal points corresponding to the number of possible state transitions in the Viterbi algorithm;

calculating distances and angular deviations between the corrected signal point and the signal points of the adaptation signal for each state;

selecting a state transition based on the result of said step of calculating distances for each state;

selecting one of said angular deviations, corresponding to said selected state transition, for each state separately;

introducing the selected angular deviation into a control loop filter wherein a control loop filter algorithm determines a phase correction signal for each state; and phase shifting, based on the phase correction signals, the next incoming signal point in the data sequence or the adaptation signal separately for each state.

2. A method according to claim 1, further including the step of:

reinitializing internal states of the control loop filter algorithm using previous internal states, the control loop filter algorithm performing low pass filtering, integration or differentiation to yield a desired signal phase tracking behavior.

3. A method according to claim 1, further including the step of:

determining appropriate initial states of the phase correction signals and the control loop filter algorithm at the start of processing the next signal sequence, at the end of processing one of the signal sequences with the final values of the phase correction signals and the control loop filter algorithm internal states.

4. A method according to claim 1 further including the step of:

determining appropriate initial states of the phase correction signals and of the control loop algorithm for starting processing of a second data sequence using the final states of the phase correction signals and the control loop filter algorithm after processing a first data sequence.

wherein a signal sequence includes in time sequence, the first data sequence, a synchronizing sequence and the second data sequence, and wherein at least the first sequence is stored prior to Viterbi analysis.

5. An apparatus for controlling the frequency of a coherent radio receiver which through a channel subjected to interference receives signal sequences including at least one synchronizing sequence and at least one data sequence, comprising:

a receiver stage for receiving a signal sequence and converting the signal sequence to a baseband signal;

an analog to digital converter connected to the receiver stage for converting the baseband signal to a plurality of signal points;

an adaptive Viterbi analyzer including adaptation circuits and a Viterbi algorithm having a desired number of states, connected to the analog to digital converter, for deriving a plurality of adaptation signals from the synchronizing sequence using the adaptation circuits, the number of adaptation signals corresponding to the number of states in the Viterbi algorithm, and for adapting to the interference in the channel based on at least the adaptation signals, and processing the signal points in the data sequence to determine the bit sequence of the data sequence;

a signal dividing circuit for dividing at a particular time one of the signal points received from the analog to digital converter into branch signal points, each of the branch signal points corresponding to a respective state of the Viterbi algorithm;

at least one phase shifter connected to the signal dividing circuit for phase shifting the branch signal point of each of the respective states through an angle associated with that respective state to obtain a respective corrected signal point;

at least one comparison circuit connected to a respective phase shifter and to the adaptation circuits for comparing the corrected signal point for each of the respective states with the adaptation signal corresponding with the respective state, said adaptation signal having signal points corresponding to the number of possible state transitions in the Viterbi algorithm, and for determining distances and angular deviations between the corrected signal point and the signal points of the adaptation signal for each state and transmitting the distances to the respective state in the Viterbi analyzer;

at least one control loop filter circuit each connected to a respective comparison circuit, to a respective phase shifter and to a corresponding state in the Viterbi analyzer, for performing a control loop algorithm including integration, differentiation or filtering to separately calculate for each state an estimate of its phase correction signal which is transmitted to the phase shifter, the Viterbi analyzer based on the Viterbi algorithm for each state selects one of said distances and transmits the corresponding selected state transition to the respective control loop filter circuit, the control loop algorithm including receiving the angular deviations and selecting one of said angular deviations corresponding to the selecting state transition.

* * * * *